US012791452B2

United States Patent

(12) United States Patent
Volakakis
(10) Patent No.: US 12,791,452 B2
(45) Date of Patent: Nov. 10, 2026

(54) SYSTEM AND METHOD FOR OBTAINING GAS SAMPLES

(71) Applicant: NC TECHNOLOGIES S.R.L., Milan (IT)

(72) Inventor: Emmanouil Volakakis, Lainate (IT)

(73) Assignee: NC TECHNOLOGIES S.R.L., Milan (IT)

( * ) Notice: Subject to any disclaimer, the term of this patent is extended or adjusted under 35 U.S.C. 154(b) by 248 days.

(21) Appl. No.: 18/837,864

(22) PCT Filed: Feb. 17, 2023

(86) PCT No.: PCT/IB2023/051439

§ 371 (c)(1),
(2) Date: Aug. 12, 2024

(87) PCT Pub. No.: WO2023/156948

PCT Pub. Date: Aug. 24, 2023

(65) Prior Publication Data

US 2025/0146916 A1 May 8, 2025

(30) Foreign Application Priority Data

Feb. 17, 2022 (IT) ........................ 102022000002924

(51) Int. Cl.
*G01N 1/40* (2006.01)
*G01N 1/22* (2006.01)

(52) U.S. Cl.
CPC ........... *G01N 1/405* (2013.01); *G01N 1/2214* (2013.01)

(58) Field of Classification Search
CPC ............................. G01N 1/405; G01N 1/2214
See application file for complete search history.

(56) References Cited

U.S. PATENT DOCUMENTS 6,477,905 B1 * 11/2002 Mitra ..................... G01N 30/00 73/863.12
9,403,122 B2 8/2016 Geckeler
11,125,732 B2 * 9/2021 Gentner ................. G01N 30/88
2009/0084199 A1 * 4/2009 Wright ................. G01N 1/2214 73/863.82

(Continued)

FOREIGN PATENT DOCUMENTS

WO 2021056943 A1 4/2021

OTHER PUBLICATIONS

Patent Cooperation Treaty, International Search Report and Written Opinion for International Application No. PCT/IB2023/051439, Jun. 12, 2023, 12 pages.

*Primary Examiner* — Shane Bomar
(74) *Attorney, Agent, or Firm* — Stetina Garred Brucker & Newboles

(57) ABSTRACT

System for obtaining gas samples, which comprises at least one VOC trap suitable for separating volatile organic compounds from a gas to be treated, wherein the VOC trap is connected to at least one H2O trap suitable to separate H2O from the gas to be treated, wherein the H2O trap is connected to at least one CO2 trap suitable to capture CO2 from the gas to be treated, wherein the CO2 trap is connected to at least one reducer suitable to reduce nitrogen and/or sulfur oxides contained in the CO2 released by the CO2 trap.
The present disclosure also relates to a method which can be carried out by such a system.

18 Claims, 1 Drawing Sheet

(56) References Cited

U.S. PATENT DOCUMENTS

| | | | | |
|---|---|---|---|---|
| 2011/0158872 | A1* | 6/2011 | Ariya | B01D 53/885<br>977/773 |
| 2019/0094195 | A1* | 3/2019 | Gentner | G01N 30/32 |
| 2020/0033236 | A1* | 1/2020 | Shaikh | G01N 1/2214 |
| 2021/0025861 | A1* | 1/2021 | Das | G01N 33/0014 |

* cited by examiner

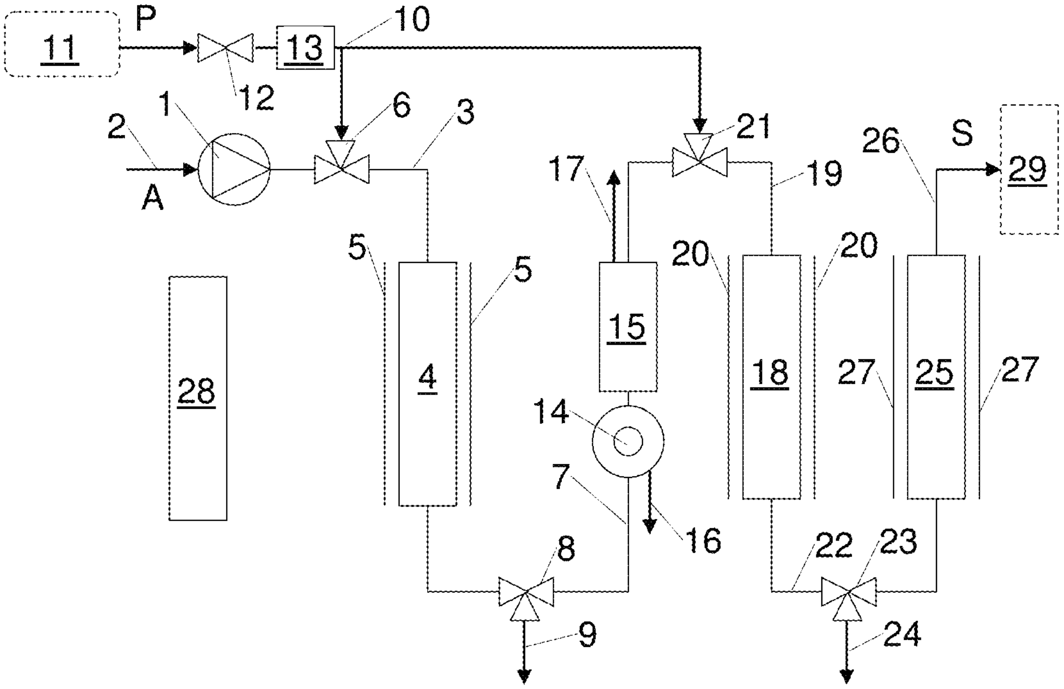
11
P
12
13
10
2
1
6
3
21
17
19
26
S
29
A
5
5
20
20
15
28
4
18
27
25
27
14
7
16
8
22
23
9
24

SYSTEM AND METHOD FOR OBTAINING GAS SAMPLES

CROSS-REFERENCE TO RELATED APPLICATIONS

This application claims priority to PCT International Application No. PCT/IB2023/051439 filed on Feb. 17, 2023, which applications claims priority to Italian Patent Application No. 102022000002924 filed on Feb. 17, 2022, the entire disclosures of which are expressly incorporated herein by reference.

STATEMENT RE: FEDERALLY SPONSORED RESEARCH/DEVELOPMENT

Not Applicable

BACKGROUND

Technical Field

The present description relates to a system for obtaining gas samples, in particular for a subsequent spectrometric analysis of CO2 (carbon dioxide) contained in these samples. The present description also relates to a method which can be carried out by such a system.

Background of the Description

Known systems (see e.g. WO 2021/056943 A1) for obtaining gas samples comprise a series of devices which filter elements or chemical compounds from a gas to be treated, in particular air. However, these known systems are relatively inefficient, expensive and/or slow, in particular for obtaining CO2 samples for spectrometric analyses.

SUMMARY OF THE DESCRIPTION

Object of the present description is therefore to provide a system free from these drawbacks. Said object is achieved with a system and a method, the main features of which are specified in the attached claims, to be considered an integral part of the present description.

Gas samples can be obtained in a relatively efficient, economic and quick way thanks to the particular combination of components employed in the system and method according to the present description.

Thanks to its architecture, which preferably includes a particular purging circuit, the system can concentrate and purge CO2 in an optimized way, above all to perform analyzes of both stable and radiogenic carbon isotopes in atmospheric CO2.

The system and the method allow to produce a relatively high volume of substantially pure samples of CO2, for example 10-100 mg samples in 10-60 minutes, in particular when the gas to be treated is air or other gas mixture.

The system, again thanks to its particular architecture, can be controlled in a completely automatic way by an electronic control unit, so as to carry out the method efficiently, easily and precisely.

The VOC trap and/or the CO2 trap of the system are preferably regenerable and/or provided with heating means in order to desorb previously adsorbed gases in a controlled manner, in particular to purge the VOC trap and/or to release the captured CO2 from the CO2 trap.

The H2O trap employed in the system and/or method preferably comprises a membrane dryer connected to a chemical H2O trap.

The H2O trap is preferably arranged downstream of the VOC trap, so as to improve the efficiency and speed in the removal of volatile organic compounds and/or H2O from the gas to be treated.

The system of the present description can be advantageously connected to the system described in EP 3575786 for the analysis of chemical elements in organic compounds, so as to obtain a synergistic effect which significantly improves the quality of the analyzes performed by a plant comprising these systems.

BRIEF DESCRIPTION OF THE DRAWINGS

Further advantages and features of the system and method according to the present description will become apparent to those skilled in the art from the following detailed description of some embodiments thereof, to be considered non-limiting examples of the claims, with reference to the attached drawings in which FIG. 1 shows a schematic block diagram of an embodiment of the system.

EXPLANATORY EMBODIMENTS

In the present description, a connection may be achieved by at least one duct allowing a gas flow between at least two components of the system.

FIG. 1 shows an embodiment of the system, in which a pump 1 can draw a gas A to be treated, for example air, biogas, industrial exhausts or other gas mixtures, from at least one inlet duct 2. The pump 1 is connected through at least one first intermediate duct 3 to at least one VOC trap 4, namely a device suitable for separating volatile organic compounds (VOC) from a gas. The VOC trap 4 can comprise a container containing adsorbent substances, preferably based on aluminosilicates, which adsorb volatile organic compounds contained in the gas A. The VOC trap 4 is preferably regenerable, namely it can be provided with heating means 5, in particular electric resistors, to heat the adsorbent substances and therefore desorb the volatile organic compounds adsorbed by the VOC trap 4. The first intermediate duct 3 can be provided with at least one first valve 6, for example a three-way solenoid valve, suitable to be connected to a source of purging gas P, so that the purging gas P can flow into the VOC trap 4 to expel the volatile organic compounds released by means of the heating means 5. The VOC trap 4 is connected to a second intermediate duct 7 to release the filtered gas A from the VOC trap 4 and/or the purging gas P mixed with the volatile organic compounds. The second intermediate duct 7 can be provided with at least one second valve 8, for example a three-way solenoid valve, suitable to be connected to a first exhaust duct 9, in particular to release the purging gas P with the volatile organic compounds outside of the system.

The purging gas P can come from an auxiliary duct 10 which can be connected to the first valve 6 and to a source 11, for example a helium cylinder. The auxiliary duct 10 can be provided with at least a third valve 12, for example a two-way solenoid valve, and/or with a flow regulator 13, for example an electro-pneumatic regulator.

The VOC trap 4 is connected, in particular through at least the second intermediate duct 7, to at least one H2O trap 14, 15 suitable for separating H2O, in particular water vapour, from a gas. In particular, the H2O trap 14, 15 can comprise a membrane dryer 14, for example a Perma Pure® membrane dryer, which is in turn connected to a chemical trap 15 of H2O, in particular a chemical trap based on magnesium perchlorate. The H2O trap 14, 15 can release the water vapor separated from the gas A through one or more exhaust ducts 16, 17.

The H2O trap 14, 15 is connected to a CO2 trap 18, in particular through at least a third intermediate duct 19. The CO2 trap 18 is suitable for capturing CO2 from a gas, in particular from gas A filtered by the H2O trap 14, 15. The CO2 trap 18 can comprise a container containing adsorbent substances, preferably based on zeolites, which adsorb the CO2 contained in gas A. The CO2 trap 18 can be regenerated, namely it can be provided with heating means 20, in particular electric resistors, for heating the adsorbing substances and desorbing CO2 which is released by the CO2 trap 18.

The third intermediate duct 19 can be provided with at least a fourth valve 21, for example a three-way solenoid valve, suitable to be connected to a source of carrier gas to release the desorbed CO2 from the CO2 trap 18 by means of the heating means 20 The purging gas P can be used as the carrier gas, in which case the fourth valve 21 can be connected to the auxiliary duct 10.

The CO2 trap 18 is connected to at least one fourth intermediate duct 22 to release the filtered gas A from the CO2 trap 18 and/or the carrier gas mixed with CO2. The fourth intermediate duct 22 can be provided with at least a fifth valve 23, for example a three-way solenoid valve, which can be connected to an exhaust duct 24 to release the gas A filtered by the CO2 trap 18 outside the system.

The CO2 trap 18 is connected at least through the fourth intermediate duct 22 to at least one reducer 25 suitable for reducing nitrogen oxides (NOx) and/or sulfur oxides (SOx) contained in the carrier gas with CO2 flowing through the reducer 25, to obtain a gas sample S. In particular, the reducer 25 can comprise a container containing reducing substances, preferably copper-based filaments, which react both with nitrogen oxides and with sulfur oxides, so that the gas sample S released by reducer 25 through an outlet 26 is substantially free from these oxides. The reducer 25 preferably comprises heating means 27, in particular electric resistors, for heating and activating the reducing substances.

The system preferably comprises an electronic control unit 28, in particular provided with microprocessor and memory, which is able to control, preferably in a programmed and/or programmable manner, the operation of the pump 1, of the valves 6, 8, 12, 21, 23, of the flow regulator 13 and/or of the heating means 5, 20, 27. For this purpose, the electronic control unit 28 is connected directly or indirectly, by means of electric or electromagnetic connections, with or without cable, to said components of the system to be controlled and/or to one or more sensors (not shown in the FIGURE), suitable to measure one or more parameters of the system, such as for example flow rates, pressures and temperatures.

The outlet 26 can be connected to an external device 29, for example a CO2 analyzer for detecting carbon isotopes in the sample gas S.

In use, during a first step of the method according to the present description, in which CO2 is captured by the CO2 trap 18, the pump 1 draws from the inlet duct 2 the gas A to be treated, which flows at a pressure greater than 1 bar, for example approx. 1.03 bar and/or with a flow rate of approx. 5 l/min, via VOC trap 4, H2O trap 14, 15 and CO2 trap 18, which filter gas A, after which the filtered gas A can be released through the exhaust duct 24. In this phase, the valves 6, 8, 21 allow the flow of gas A along the intermediate ducts 3, 7 and 19, while the valve 23 diverts the flow from the intermediate duct 22 to the exhaust duct 24. The heating means 5 of the VOC trap 4 and the heating means 20 of the CO2 trap 18 are switched off.

During a second step of the method, in which CO2 is released from the CO2 trap 18, a carrier gas, in particular the same purging gas P, can flow from the source 11 into the auxiliary duct 10, through the valve 21, which is open towards the intermediate duct 19 and enter the CO2 trap 18, which releases previously adsorbed CO2, as it is heated by the heating means 20, in particular at a temperature higher than 200° C., preferably higher than 400° C. The temperature of the CO2 trap 18 can vary according to the percentage of CO2 to be mixed with the carrier gas. During this phase, the valve 23 allows the flow of gas along the intermediate duct 22, so that the carrier gas mixed with the CO2 released from the CO2 trap 18 is reduced by the reducer 25, which is heated by the heating means 27, in particular at a temperature higher than 350° C., to obtain a sample gas S, which is in turn emitted by the reducer 25 from the outlet 26, for example to be treated afterwards by the external device 29.

In a purge step, in which volatile organic compounds are released by the VOC trap 4, the purging gas P flows from the auxiliary duct 10 to the valve 6, which is open towards the intermediate duct 3, and enters the VOC trap 4, which desorbs the previously adsorbed volatile organic compounds as it is heated by the heating means 5, in particular at a temperature higher than 400° C. In this phase, the valve 8 connects the intermediate duct 7 to the exhaust duct 9, so that the purging gas P mixed with the volatile organic compounds desorbed by the VOC trap 4 can be released through the exhaust duct 9.

In the present embodiment the H2O trap 14, 15 is preferably arranged downstream of the VOC trap 4, so that the removal of water vapor from the gas A to be treated takes place after the removal of volatile organic compounds. However, in an alternative embodiment, the H2O trap 14, 15 can be arranged upstream of the VOC trap 4.

Variations or additions can be made by those skilled in the art to the embodiments described and illustrated herein while remaining within the scope of the following claims. In particular, further embodiments may comprise the technical features of one of the following claims with the addition of one or more technical features described in the text or illustrated in the drawings, taken individually or in any reciprocal combination, including features equivalent to them.

The invention claimed is:

1. A system for obtaining gas samples, which comprises at least one VOC trap suitable to separate volatile organic compounds from a gas to be treated, wherein the VOC trap is connected to at least one H2O trap suitable to separate H2O from the gas to be treated, wherein the H2O trap is connected to at least one CO2 trap suitable to capture CO2 from the gas to be treated, wherein the CO2 trap comprises a container containing substances suitable for adsorbing and desorbing CO2, wherein the CO2 trap is provided with heating means for heating the adsorbing substances of the CO2 trap and releasing the CO2 captured by the CO2 trap, wherein the CO2 trap is connected to at least one reducer suitable to reduce nitrogen and/or sulphur oxides contained in the CO2 released by the CO2 trap, wherein the CO2 trap is connected to the reducer by means of at least one intermediate duct provided with at least one valve connected to an exhaust duct.

2. The system according to claim 1, wherein the H2O trap is arranged downstream of the VOC trap.

3. The system according to claim 1, wherein the H2O trap comprises a membrane dryer connected to an H2O chemical trap.

4. The system according to claim 1, wherein the reducer comprises a container containing reducing substances which react both with nitrogen oxides and with sulfur oxides.

5. The system according to claim 1, wherein the VOC trap and/or the reducer are provided with heating means for heating adsorbing substances contained in the VOC trap or reducing substances contained in the reducer, respectively.

6. The system according to claim 1, wherein the VOC trap is connected to at least one valve connected to an auxiliary duct suitable to be connected to a source of purging gas, wherein the VOC trap is also connected to at least one valve connected to an exhaust duct of the purging gas.

7. The system according to claim 1, wherein the H2O trap is connected to the CO2 trap by means of at least one intermediate duct provided with at least one valve connected to an auxiliary duct suitable to be connected to a source of carrier gas.

8. The system according to claim 1, wherein the reducer is connected through an outlet to a CO2 analyzer for detecting carbon isotopes in a gas sample released by the reducer.

9. The system according to claim 1, wherein an electronic control unit is connected to one or more of said valves, to one or more of said heating means and/or to one or more sensors suitable to measure one or more parameters of the system.

10. A method for obtaining gas samples, which comprises the following operative steps:

at least one VOC trap separates volatile organic compounds from a gas to be treated;

at least one H2O trap separates H2O from the gas to be treated;

at least one CO2 trap captures CO2 from the gas to be treated;

the gas to be treated, filtered by the VOC trap, the H2O trap and the CO2 trap, is released through an exhaust duct;

the CO2 trap releases the captured CO2;

at least one reducer reduces nitrogen and/or sulphur oxides contained in the CO2 released by the CO2 trap.

11. The method according to claim 10, wherein the H2O trap is arranged downstream of the VOC trap.

12. The method according to claim 10, wherein the H2O trap comprises a membrane dryer connected to an H2O chemical trap.

13. The method according to claim 10, wherein the reducer comprises a container containing reducing substances which react both with nitrogen oxides and with sulfur oxides.

14. The method according to claim 10, wherein the VOC trap and/or the reducer are provided with heating means for heating adsorbing substances contained in the VOC trap or reducing substances contained in the reducer, respectively.

15. The method according to claim 10, wherein the VOC trap is connected to at least one valve connected to an auxiliary duct suitable to be connected to a source of purging gas, wherein the VOC trap is also connected to at least one valve connected to an exhaust duct of the purging gas.

16. The method according to claim 10, wherein the H2O trap is connected to the CO2 trap by means of at least one intermediate duct provided with at least one valve connected to an auxiliary duct suitable to be connected to a source of carrier gas.

17. The method according to claim 10, wherein the reducer is connected through an outlet to a CO2 analyzer for detecting carbon isotopes in a gas sample released by the reducer.

18. The method according to claim 10, wherein an electronic control unit is connected to one or more of said valves, to one or more of said heating means and/or to one or more sensors suitable to measure one or more parameters of a system which carries out the method.

* * * * *